United States Patent
Chiang et al.

(10) Patent No.: US 11,418,066 B2
(45) Date of Patent: Aug. 16, 2022

(54) TECHNIQUES FOR CHARGING AND/OR DISCHARGING A BATTERY USING FREQUENCY MODULATION

(71) Applicant: Massachusetts Institute of Technology, Cambridge, MA (US)

(72) Inventors: Yet-Ming Chiang, Weston, MA (US); Bohua Wen, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/995,689

(22) Filed: Aug. 17, 2020

(65) Prior Publication Data
US 2021/0119489 A1    Apr. 22, 2021

Related U.S. Application Data

(60) Provisional application No. 62/916,302, filed on Oct. 17, 2019, provisional application No. 62/916,470, filed on Oct. 17, 2019.

(51) Int. Cl.
*H02J 7/00* (2006.01)
*H02J 50/20* (2016.01)
*H01M 10/44* (2006.01)

(52) U.S. Cl.
CPC .............. *H02J 50/20* (2016.02); *H01M 10/44* (2013.01)

(58) Field of Classification Search
CPC ................................. H02J 50/20; H01M 10/44
USPC ........................................................ 320/107
See application file for complete search history.

(56) References Cited

U.S. PATENT DOCUMENTS

| | | |
|---|---|---|
| 4,016,473 A | 4/1977 | Newman |
| 5,539,298 A | 7/1996 | Perkins et al. |
| 5,801,515 A | 9/1998 | Chen et al. |
| 5,889,385 A | 3/1999 | Podrazhansky et al. |
| 9,306,252 B2 | 4/2016 | Kristofek et al. |
| 9,397,516 B2 | 7/2016 | Hunter et al. |
| 9,761,850 B2 | 9/2017 | Kristofek et al. |
| 9,966,780 B2 | 5/2018 | Sherstyuk et al. |

(Continued)

OTHER PUBLICATIONS

PCT/US2020/046710, Oct. 26, 2020, International Search Report and Written Opinion.

(Continued)

*Primary Examiner* — Nathaniel R Pelton
(74) *Attorney, Agent, or Firm* — Wolf, Greenfield & Sacks, P.C.

(57) ABSTRACT

Described herein are techniques that increase the charging and/or discharging rate of a rechargeable battery, at least in part, by using frequency modulated (FM) signals having a frequency in the megahertz (MHz) frequency range. In some embodiments, the MHz frequency range may include any frequency between 0.1 MHz and 1 gigahertz (GHz). In some embodiments, a battery charger described herein may be configured to generate and transmit, to a battery, an FM signal modulated over a frequency range during a period of time, the FM signal having a frequency of at least 0.5 MHz during at least a first portion of the period of time. In some embodiments, a method described herein includes transmitting an FM signal modulated over a frequency range during a period of time and having a frequency of at least 0.5 MHz during at least a first portion of the period of time to a battery.

20 Claims, 11 Drawing Sheets

(56) References Cited

U.S. PATENT DOCUMENTS

| | | | |
|---|---|---|---|
| 10,069,313 B2 | 9/2018 | Tkachenko et al. | |
| 10,084,331 B2 | 9/2018 | Sherstyuk et al. | |
| 10,135,281 B2 | 11/2018 | Tkachenko et al. | |
| 2012/0098481 A1 | 4/2012 | Hunter et al. | |
| 2013/0108902 A1 | 5/2013 | Kristofek et al. | |
| 2013/0330577 A1 | 12/2013 | Kristofek et al. | |
| 2015/0107989 A1* | 4/2015 | Tateno | H01M 10/4242 204/196.04 |
| 2016/0104966 A1 | 4/2016 | Cousineau et al. | |
| 2016/0181674 A1 | 6/2016 | Kristofek et al. | |
| 2017/0005497 A1 | 1/2017 | Sherstyuk et al. | |
| 2017/0200973 A1* | 7/2017 | Ihara | H01M 10/0567 |
| 2018/0191187 A1 | 7/2018 | Sherstyuk et al. | |
| 2018/0219390 A1 | 8/2018 | Tkachenko et al. | |
| 2018/0261808 A1 | 9/2018 | Brace et al. | |
| 2019/0221895 A1 | 7/2019 | Konopka et al. | |

OTHER PUBLICATIONS

International Search Report and Written Opinion for International Application No. PCT/US2020/046710 dated Oct. 26, 2020.

Biggs, Gbatteries let you charge your car as quickly as visiting the pump. TechCrunch. Jan. 15, 2019:2 pages. https://techcrunch.com/2019/01/15/gbatteries-let-you-charge-your-car-as-quickly-as-visiting-the-pump/ [last accessed Nov. 18, 2020].

Malhotra, Nucleus Scientific tech could charge your phone in minutes. Digit. May 6, 2015:2 pages, https://www.digit.in/news/general/nucleus-scientific-tech-could-charge-your-phone-in-minutes-25986.hml [last accessed Nov. 18, 2020].

Tsai et al., Single-particle measurements of electrochemical kinetics in NMC and NCA cathodes for Li-ion batteries. Energy & Environmental Science. 2018;11(4):860-71.

\* cited by examiner

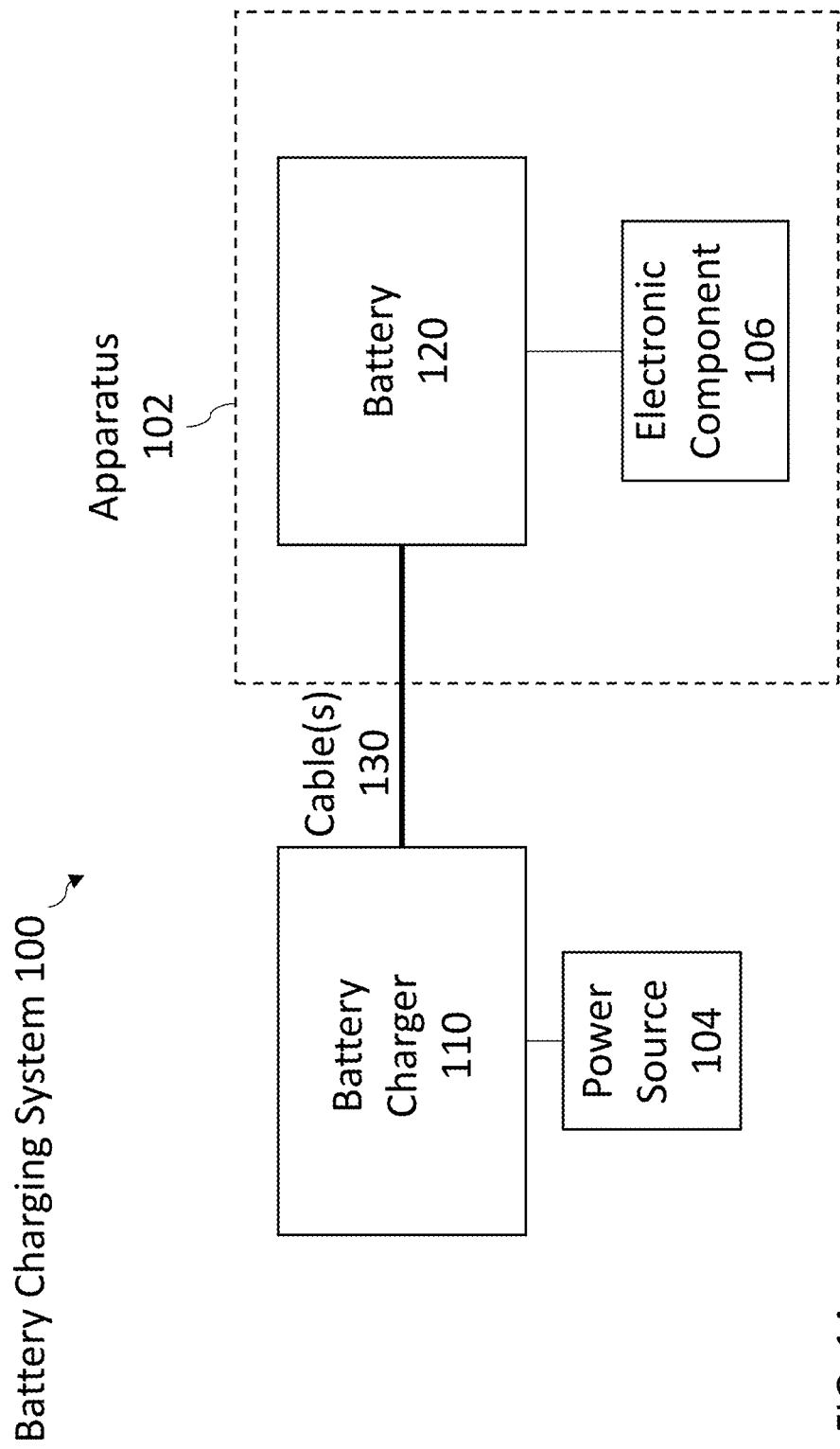

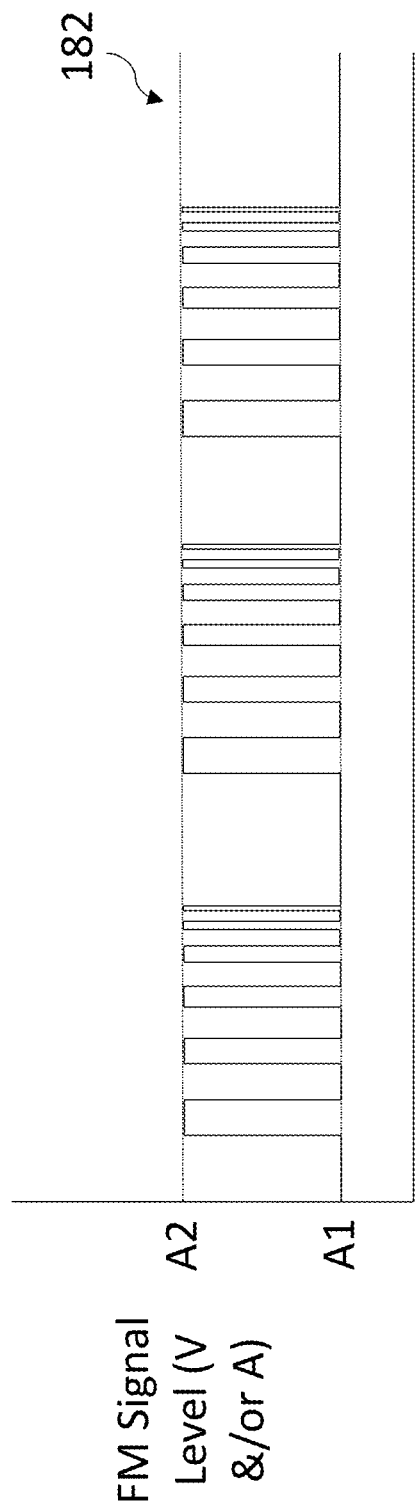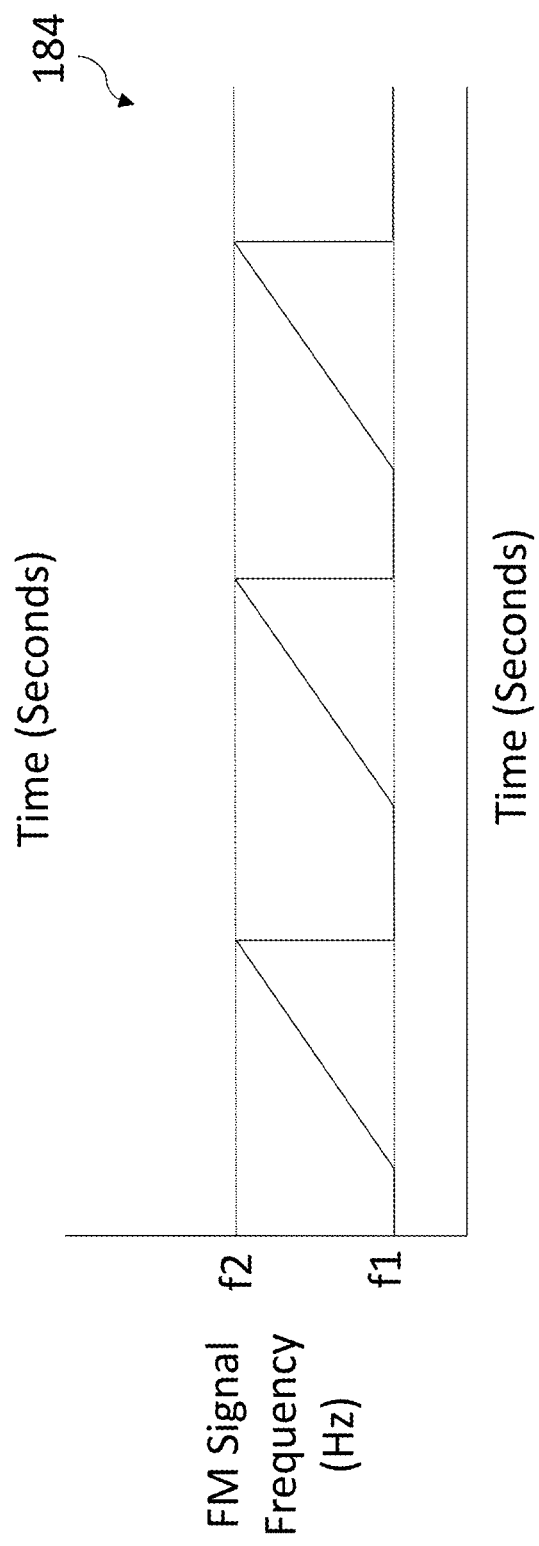

TECHNIQUES FOR CHARGING AND/OR DISCHARGING A BATTERY USING FREQUENCY MODULATION

RELATED APPLICATIONS

This application claims priority under 35 U.S.C. § 119(e) to U.S. Provisional Application Ser. No. 62/916,302, filed Oct. 17, 2019, entitled "INVESTIGATION OF MEGAHERTZ FREQUENCY MODULATION EFFECTS ON CHARGE AND DISCHARGE BEHAVIOR OF LITHIUM ION BATTERIES," and to U.S. Provisional Application Ser. No. 62/916,470, filed Oct. 17, 2019, entitled "METHODS AND COMPOSITIONS FOR OPTIMIZING ELECTRICAL OPERATION OF BATTERIES," each application of which is incorporated herein by reference in its entirety for all purposes.

FEDERALLY SPONSORED RESEARCH

This invention was made with government support under DE-SC0012583 awarded by the Department of Energy. The government has certain rights in the invention.

BACKGROUND

A battery typically includes an electrolyte and a plurality of electrodes. The electrolyte may include an ionically-conductive material that allows for the transport of ions through the electrolyte between the electrodes when a voltage of the battery is applied to one or more other devices and current is drawn from the electrodes of the battery. The battery may be capable of providing an operating voltage and/or current when fully charged. As the ions travel through the electrolyte between the electrodes, the battery may be capable of providing a lower voltage and less current. When all of the ions have traveled from a first electrode (e.g., anode) to a second electrode (e.g., cathode), the battery may be depleted of charge. In the depleted state, a battery may not provide substantially any voltage and/or current.

In a rechargeable battery, a voltage and/or current may be applied to the electrodes of the battery to cause ions to travel back to the first electrode from the second electrode, thus restoring the battery's capability of providing the operating voltage and/or current. However, it can take some time to charge the rechargeable battery from the depleted state before the battery is once again fully charged. Conventional techniques for increasing the rate at which a battery can be recharged would benefit from improvement.

BRIEF SUMMARY

Some aspects of the present disclosure provide a method comprising transmitting, to a battery, a frequency modulated (FM) signal modulated over a frequency range during a period of time, the FM signal having a frequency of at least 0.5 megahertz (MHz) during at least a first portion of the period of time.

Some aspects of the present disclosure provide a battery charger configured to generate a frequency modulated (FM) signal having a frequency of at least 0.5 megahertz (MHz) during at least a first portion of a period of time and transmit the FM signal to a battery during the period of time.

Some aspects of the present disclosure provide a battery charging system comprising a battery and a battery charger configured to generate a frequency modulated signal having a frequency of at least 0.5 megahertz (MHz) during at least a portion of a period of time and transmit the frequency modulated signal to the battery during the period of time.

The foregoing summary is not intended to be limiting. Moreover, in accordance with various embodiments, aspects of the present disclosure may be implemented alone or in combination with other aspects.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A is a block diagram of an exemplary battery charging system, according to some embodiments.

FIG. 1B is a graph of signal level over time for an exemplary frequency modulated (FM) signal that may be provided from the battery charger to the battery of FIG. 1A, according to some embodiments.

FIG. 1C is a graph of signal frequency over time for the FM signal of FIG. 1B, according to some embodiments.

DETAILED DESCRIPTION

Figure 2A:
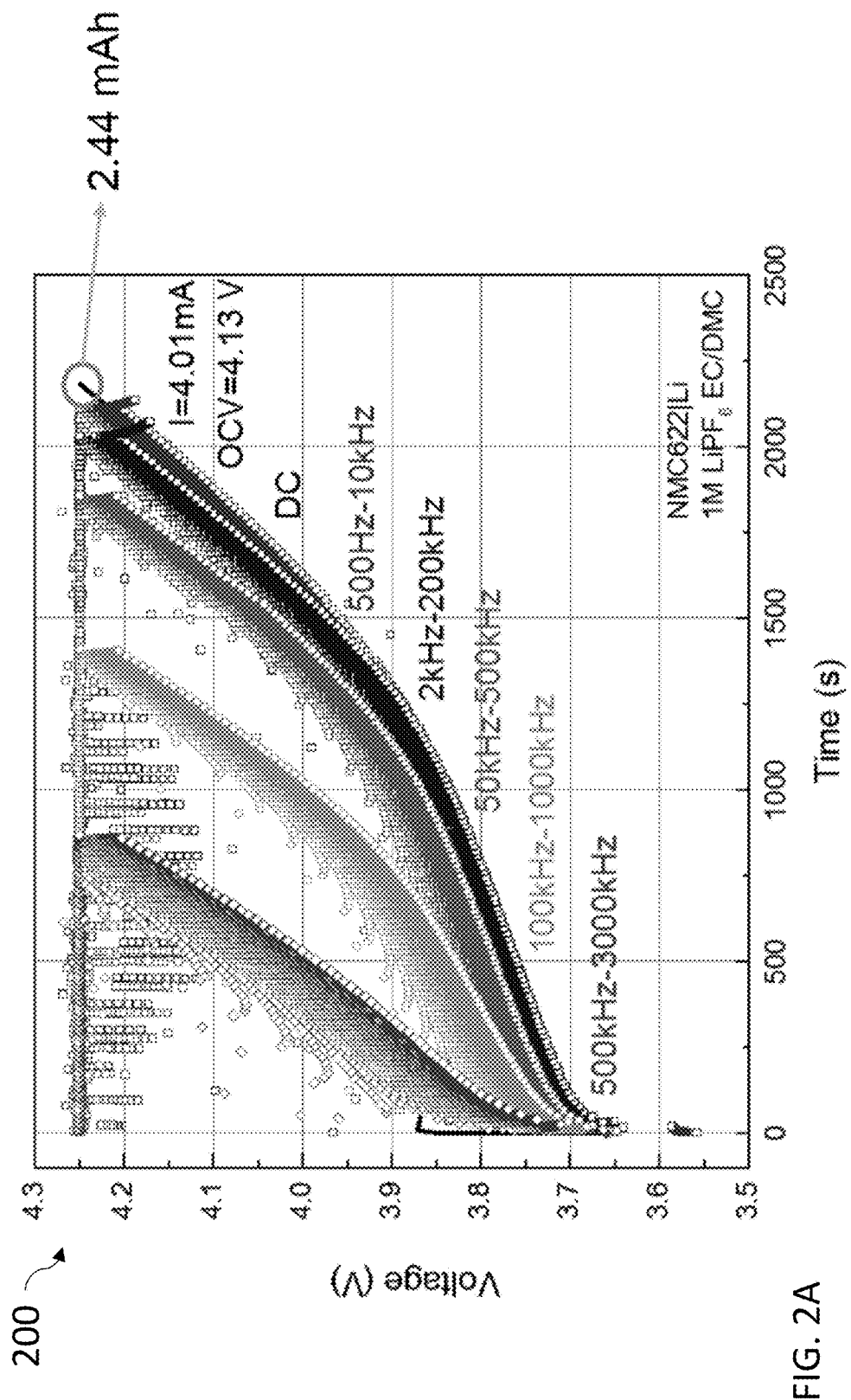
FIG. 2A is a graph of voltage over time for a plurality of batteries charged using a respective plurality of FM signals, according to some embodiments.

The inventors have developed techniques that increase the charging and/or discharging rate of a rechargeable battery, at least in part, by using frequency modulated (FM) signals having a frequency in the megahertz (MHz) frequency range. In some embodiments, the MHz frequency range may include any frequency between 0.1 MHz and 1 gigahertz (GHz). In some embodiments, an FM signal may be any voltage and/or current signal modulated over a period of time such that a frequency of the signal varies over the period of time within a predetermined frequency range. For example, an FM signal in the MHz frequency range may have a frequency that varies between 0.1 MHz and 1 MHz, between 0.5 MHz and 0.6 MHz, and/or between 0.5 MHz and 3 MHz. The inventors found that generating and transmitting an FM signal in the MHz frequency range to a battery increases the rate at which the battery charges and/or discharges as compared to direct current (DC) and low frequency signals (e.g., below the MHz frequency range).

In some embodiments, a battery charger described herein may be configured to generate and transmit, to a battery, an FM signal modulated over a frequency range during a period of time, the FM signal having a frequency of at least 0.5 MHz during at least a first portion of the period of time. According to various embodiments, the frequency of the FM signal may be at least 1 MHz, at least 2 MHz, and/or at least 3 MHz during the first portion of the period of time. For example, the FM signal may be modulated over a frequency range from 0.1 MHz to 1 MHz, from 0.5 MHz to 0.6 MHz, and/or from 0.5 MHz to 3 MHz. In some embodiments, the battery charger may be configured to sweep the frequency of the FM signal over the frequency range, as described further herein. It should be appreciated that FM signals described herein may be modulated over any range or sub-range of frequencies within the MHz frequency range.

In some embodiments, a battery charging system described herein may include a battery charger and a battery. In some embodiments, a battery may include a single electrochemical cell. In some embodiments, a battery may include multiple electrochemical cells. In some embodiments, the battery may include a lithium salt, such as a lithium-hexafluorophosphate (LiPF6) salt and/or a lithium-bistrifluoromethanesulfonylimide (LiTFSI) salt. In some embodiments, the battery may include an electrolyte that includes the lithium salt and dimethyl carbonate (DMC) and/or ethyl carbonate (EC). The inventors found that FM signals modulated over certain frequency ranges increase the charging rate of batteries having particular types of electrolytes. In one example, a first electrolyte consisting of LiPF6 and LiTFSI in DMC charged faster and to a higher operating voltage than a second electrolyte consisting of LiPF6 in DMC and EC when an FM signal modulated between 0.5 MHz and 0.6 MHz was transmitted to first and second batteries respectively including the first and second electrolytes.

In some embodiments, an FM signal transmitted to a battery couples to components of the electrode and/or electrolyte of the battery to increase the operating characteristics of the battery. Without being bound by any particular theory, an FM signal having particular frequency characteristics (e.g., frequency range and/or sweep) selected based on the composition of a rechargeable battery (e.g., a Lithium-ion battery) allows binding between the working ion of the battery and the solvent, salt, or additive moieties in the electrolyte, or between the working ion and the electrochemically active electrodes of the battery, to be diminished or overcome by the input electrical signal, thereby increasing the rate of working ion transport in the battery. In some embodiments, the interfacial charge transfer rate of the working ion is increased.

In some embodiments, the FM signal couples to the solvation shell of a working ion in the electrolyte, and the frequency and/or amplitude of the FM signal is selected to preferentially desolvate the working ion. In some embodiments, the frequency and/or amplitude characteristics of the FM signal are selected based on the binding energies and masses of the moieties that comprise the solvation shell of the working ion.

In some embodiments, the FM signal causes local excitation and heating of the constituents of the electrolyte or electrode materials and increased working ion transport rates.

In some embodiments, FM signals described herein may be transmitted in accordance with galvanostatic (constant-current) techniques, potentiostatic (constant-voltage) techniques, galvanostatic followed by potentiostatic techniques, galvanostatic intermittent titration testing (GITT) in which galvanostatic input is followed by open circuit (e.g., zero current) relaxation, potentiostatic intermittent titration testing (PITT) in which potentiostatic input is followed by grounded (e.g., zero voltage) relaxation, and/or combinations or superpositions of these techniques and/or the like.

It should be appreciated that examples of FM signals and/or electrolyte configurations described herein are not intended to be limiting and are merely illustrative of the techniques developed by the inventors.

FIG. 1A is a block diagram of an exemplary battery charging system 100, according to some embodiments. In FIG. 1A, the system 100 includes a battery charger 110 and a battery 120 coupled to the battery charger 110 via one or more electrical cables 130. The battery charger 110 is coupled to a power source 104. For example, the power source 104 may be an electrical outlet configured to receive power from an electrical plant and/or an electrical generator. In FIG. 1A, the battery is included within an apparatus 102 and coupled to at least one electronic component 106. For example, the apparatus 102 may be an electric vehicle such as an electric car and one of the electronic component(s) 106 may be the motor that powers the electric car. In this example, the electrical cable(s) 130 may be removably coupled (e.g., via an electrical connector) to a charging port of the electric car to receive a charging signal from the battery charger 110 and provide the charging signal to the battery 120 to charge the battery.

In some embodiments, the battery charger 110 may be configured to generate and transmit an FM signal to the battery 120 via the electrical cable(s) 130 to charge the battery 120. In some embodiments, the electronic component 106 may be configured to draw power from the battery 120 using an FM signal. Exemplary FM signals are described herein including with reference to FIGS. 1B-1C.

In some embodiments, the battery may be an Li-ion battery, such as including an Li salt. For example, the battery may include LiPF6 and/or LiTFSI. In some embodiments, the battery may include an electrolyte that includes the LiPF6 and/or LiTFSI with DMC and/or EC. For example, the battery may include between 1 and 2 moles per liter (M) of LiPF6 in DMC or DMC and EC, such as 1 M of LiPF6 in DMC, 1.5 M of LiPF6 in DMC, 2 M of LiPF6 in DMC, or 1M of LiPF6 in DMC and EC. In this or another example, the battery may include between 1 and 5 M of LiTFSI in DMC, such as 3 M, 4 M, or 5 M of LiTFSI in DMC, or 1 M of LiTFSI and 1 M of LiPF6 in DMC. It should be appreciated that other concentrations of LiPF6 or LiTFSI and/or other solvents may be used. In some embodiments, the battery may include two or more electrodes, such as an Li anode and a nickel manganese cobalt (NMC) cathode. For example, the cathode(s) may be NMC622 or NMC333 in some embodiments.

FIG. 1B is a graph 182 of signal level over time for an exemplary frequency modulated (FM) signal that may be generated by and transmitted from the battery charger 110 to the battery 120 in system 100 of FIG. 1A, according to some embodiments. As shown in the graph 182, an FM signal may include a plurality of pulses transmitted over a period of time. For example, FIG. 1B shows three pluralities of pulses transmitted over three different periods of time. In FIG. 1B, the signal level of the pulses oscillates between a first signal level A1 and a second signal level A2. In one example, the FM signal may be a voltage signal having a voltage that varies from a first voltage level of A1 volts (V) to a second voltage level of A2 V. For instance, A2 may be equal to 4 V and A1 may be ground (e.g., substantially 0 V). Alternatively or additionally, the FM signal may be a current signal that varies from a first current level of A1 amps (A) to a second current level of A2 A. For example, A2 may be equal to 30 milliamps (mA) and A1 may be an open circuit (e.g., substantially 0 A).

In FIG. 1B, the frequency of each plurality of pulses varies over the respective period of time. In the example FM signal shown in FIG. 1A, the FM signal may be a frequency sweep signal having a frequency that increases within each period of time.

FIG. 1C is a graph 184 of signal frequency over time for the FM signal of FIG. 1B, according to some embodiments. As shown in FIG. 1C, the frequency of each plurality of pulses of the FM signal increases during each time period from a first frequency f1 to a second frequency f2. For example, the first frequency f1 may be 0.1 MHz or 0.5 MHz and the second frequency f2 may be 0.6 MHz, 1 MHz, or 3 MHz. Although FIG. 1C shows a continuous, linear increase in the frequency of the FM signal, it should be appreciated that the frequency may increase discretely and/or over non-linear steps. For example, the frequency of the signal may increase linearly by a predetermined frequency amount (e.g., 0.1 MHz) at each step and/or may increase exponentially (e.g., double) at each step. In FIGS. 1B-1C, the frequency of the FM signal increases for each pulse of a respective plurality of pulses. However, it should be appreciated that multiple consecutive pulses of the FM signal may have the same frequency in some embodiments.

FIG. 2A is a graph 200a of voltage over time for a battery charged using a plurality of different FM signals, according to some embodiments. In FIG. 2A, a DC signal and first, second, third, fourth, and fifth FM signals were transmitted to a battery having an electrolyte including 1 M of LiPF6 in DMC and EC, and further including an Li anode and an NMC 622 cathode. The first FM signal was swept from 500 Hz to 10 kilohertz (kHz), the second FM signal was swept from 2 kHz to 0.2 MHz, the third FM signal was swept from 50 kHz to 0.5 MHz, the fourth FM signal was swept from 0.1 MHz to 1 MHz, and the fifth FM signal was swept from 0.5 MHz to 3 MHz. Each FM signal oscillated between a first current level of open circuit current to a second current level of about 4 A. The DC current level was 4 mA and the FM signals had a 20% duty cycle.

As shown in FIG. 2A, the DC signal charged the battery to 4.25 V after about 2200 seconds (s), the first FM signal charged the battery to 4.25 V after about 2100 s, the second FM signal charged the battery to 4.25 V after about 2000 s, the third FM signal charged the battery to 4.25 V after about 1800 s, the fourth FM signal charged the battery to 4.25 V after about 1350 s, and the fifth FM signal charged the battery to 4.25 V after about 750 s.

As shown in FIG. 2A, the battery charged faster when higher frequency FM signals were applied. For example, the fifth FM signal caused the voltage of the battery to increase faster than the fourth FM signal, the fourth FM signal caused the voltage of the battery to increase faster than the third FM signal, and so on.

Figure 2C:
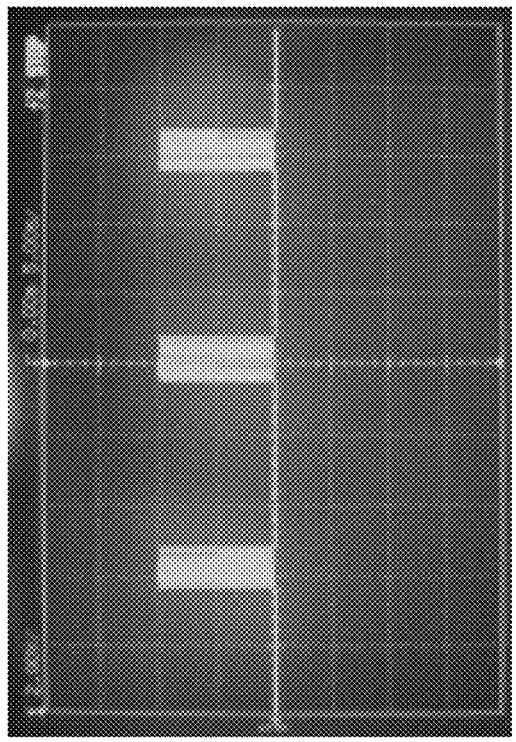
FIG. 2C is a graph of signal level over time for an FM signal used to discharge the battery, according to some embodiments.
Figure 2B:
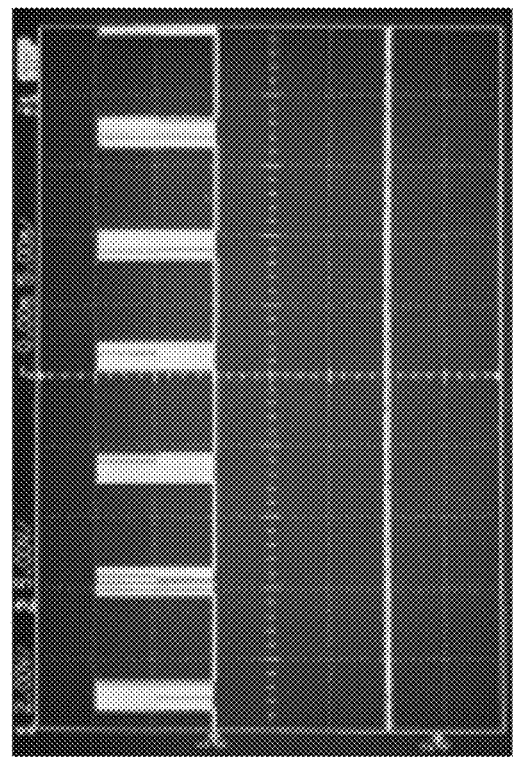
FIG. 2B is a graph of signal level over time for one of the FM signals shown in FIG. 2A, according to some embodiments.

FIG. 2B is a graph 200b of signal level over time for one of the FM signals shown in FIG. 2A, according to some embodiments. As shown in FIG. 2B, a frequency of a plurality of pulses of the FM signal varied during each of a plurality of time periods, with FIG. 2B showing three time periods of the FM signal.

FIG. 2C is a graph 200c of signal level over time for an FM signal used to discharge the battery, according to some embodiments. As shown in FIG. 2C, the battery transmitted an FM signal with pluralities of pulses over respective time periods, with FIG. 2C showing six full time periods and part of a seventh time period. FIG. 2C shows that the frequency of the pulses varied within each time period.

FIGS. 2D-2G are graphs of current level over time for the first, second, fourth, and fifth FM signals of FIG. 2A, respectively, according to some embodiments.

Figure 2E:
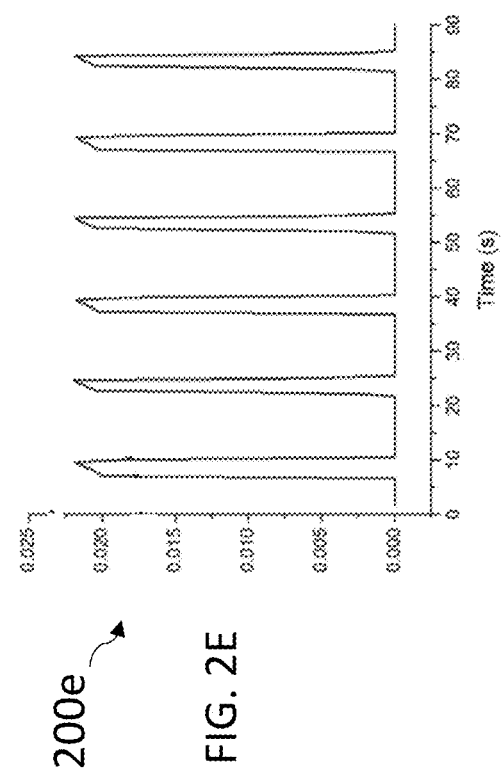
FIG. 2E is a graph of current level over time for the second FM signal of FIG. 2A, according to some embodiments
Figure 2G:
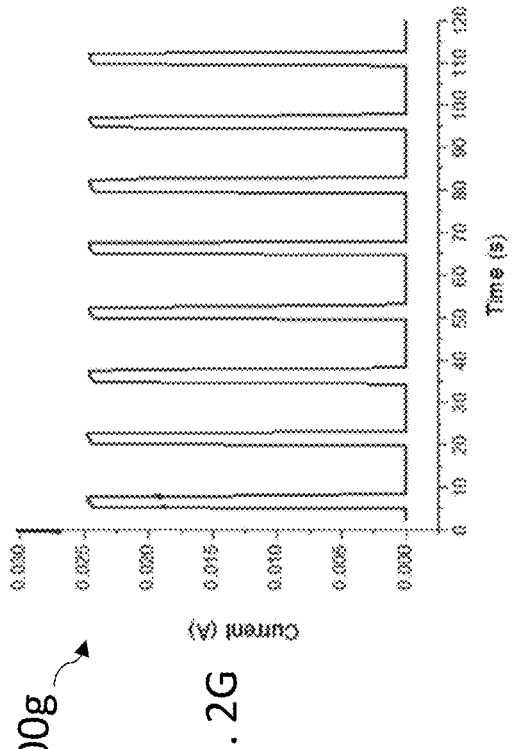
FIG. 2G is a graph of current level over time for the fifth FM signal of FIG. 2A, according to some embodiments.
Figure 2D:
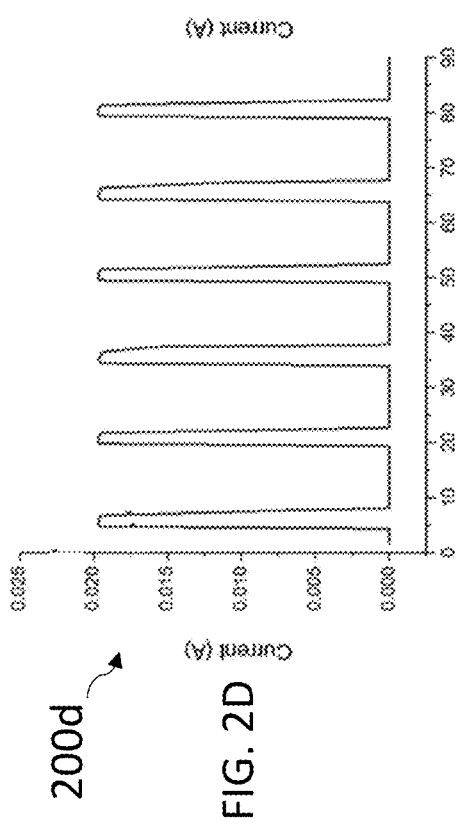
FIG. 2D is a graph of current level over time for the first FM signal of FIG. 2A, according to some embodiments

FIG. 2D is a graph 200d of current level over time for the first FM signal of FIG. 2A, according to some embodiments. As shown in FIG. 2D, the current provided to the battery during each time period of the first FM signal was about 20 mA.

FIG. 2E is a graph 200e of current level over time for the second FM signal of FIG. 2A, according to some embodiments. As shown in FIG. 2E, the current provided to the battery during each plurality of pulses of the second FM signal increased during each time period from about 20 mA to about 22 mA.

Figure 2F:
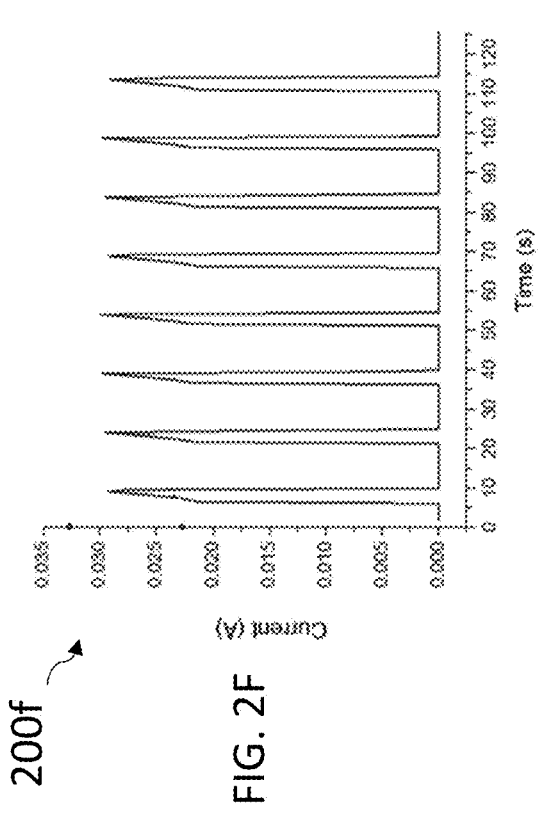
FIG. 2F is a graph of current level over time for the fourth FM signal of FIG. 2A, according to some embodiments.

FIG. 2F is a graph 200f of current level over time for the fourth FM signal of FIG. 2A, according to some embodiments. As shown in FIG. 2F, the current provided to the battery during each plurality of pulses of the fourth FM signal increased during each time period from about 21 mA to about 29 mA.

FIG. 2G is a graph 200g of current level over time for the fifth FM signal of FIG. 2A, according to some embodiments. As shown in FIG. 2G, the current provided to the battery during each plurality of pulses of the fifth FM signal increased during each time period from about 24 mA to about 25 mA.

As shown in FIGS. 2D-2G, the battery drew higher levels of current during transmission of the fourth and fifth FM signals than the first and second FM signals.

Figure 3B:
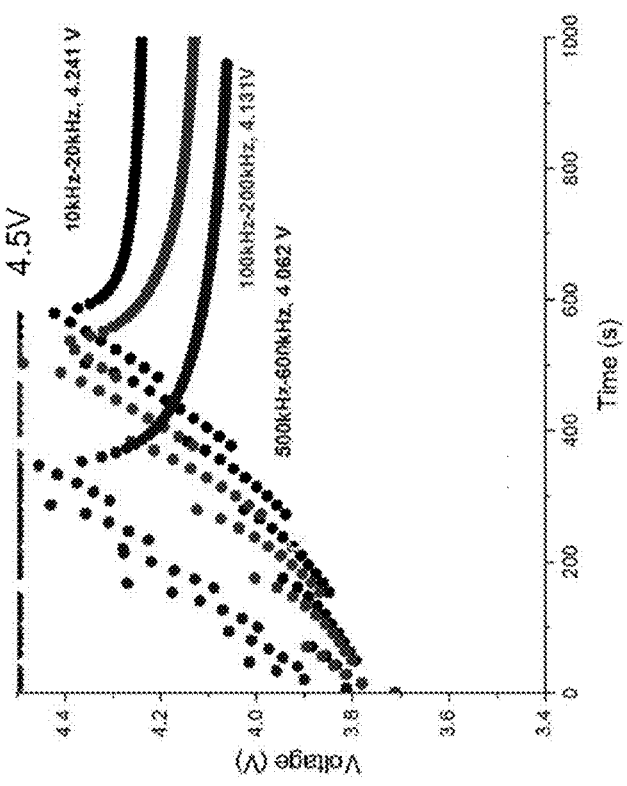
FIG. 3B is a graph of voltage over time for a second battery charged using three of the FM signals of FIG. 3A, according to some embodiments.
Figure 3A:
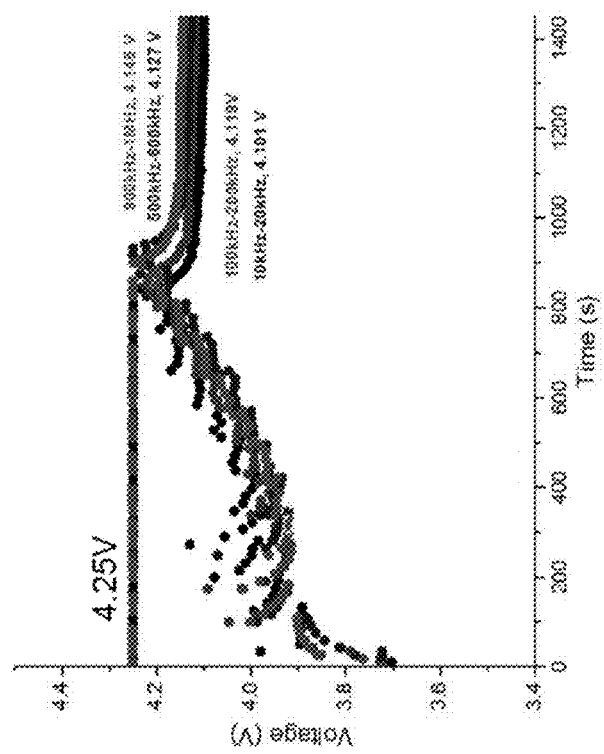
FIG. 3A is a graph of voltage over time for a first battery charged using a plurality of different FM signals, according to some embodiments.

FIGS. 3A-3B are graphs of voltage over time for two different batteries, each charged using a plurality of different FM signals, according to some embodiments.

FIG. 3A is a graph 300a of voltage over time for a first battery having an electrolyte including 1 M LiPF6 in DMC and EC, and further including an Li anode and an NMC333 cathode. The first battery was charged using a first FM signal swept from 10 kHz to 20 kHz, a second FM signal swept from 0.1 MHz to 0.2 MHz, a third FM signal swept from 0.5 MHz to 0.6 MHz, and a fourth FM signal swept from 0.9 MHz to 1 MHz. As shown in FIG. 3A, each FM signal charged the first battery to 4.25 V in a time between 850 s and 950 s. The FM signals had a 35% duty cycle.

FIG. 3B is a graph 400 of voltage over time for a second battery having an electrolyte including 1 M LiPF6 and 1 M of LiTFSI in DMC, and further including an Li anode and an NMC333 cathode. The second battery was charged using a first FM signal swept from 10 kHz to 20 kHz, a second FM signal swept from 0.1 MHz to 0.2 MHz, and a third FM signal swept from 0.5 MHz to 0.6 MHz. The first FM signal charged the second battery to 4.5 V after about 600 s, the second FM signal charged the second battery to 4.5 V after about 500 s, and the third FM signal charged the second battery to 4.5 V after about 400 s. The FM signals had a 35% duty cycle.

Figure 4:
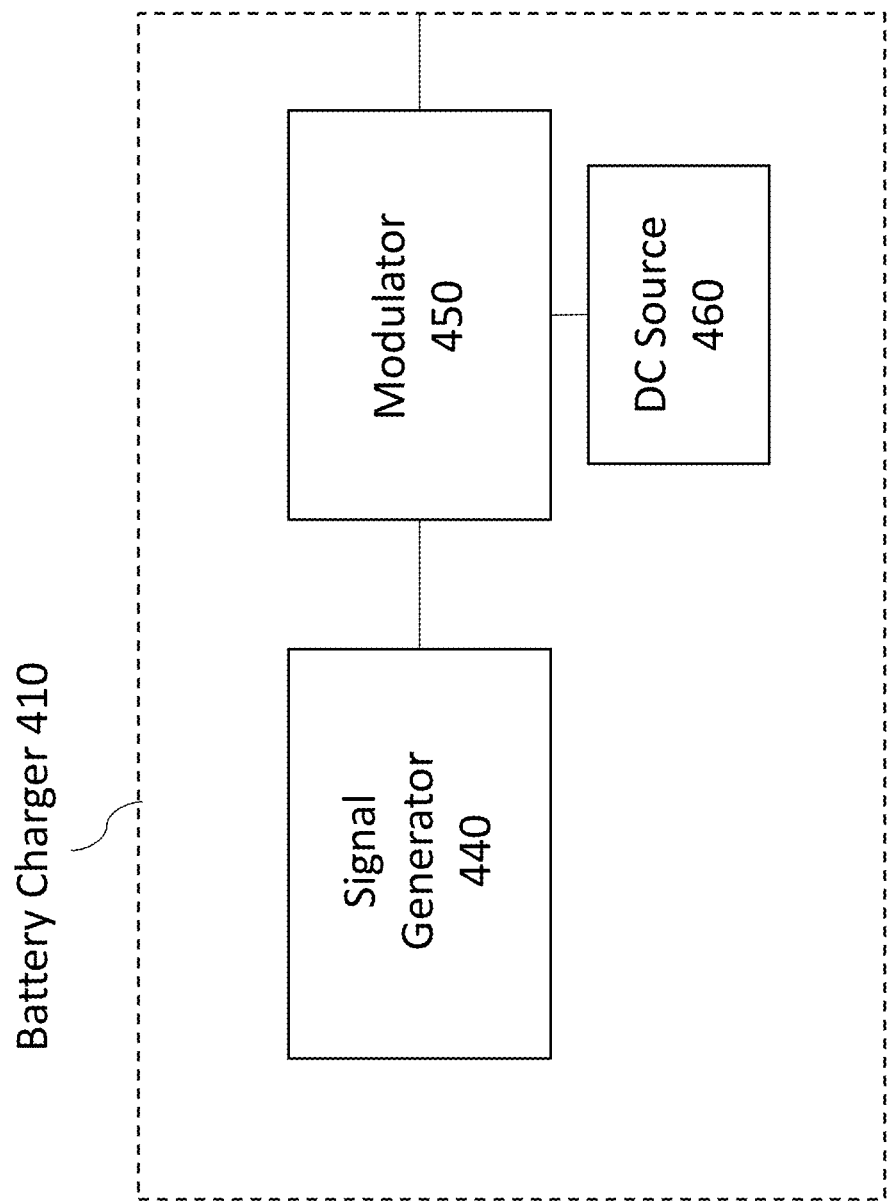
FIG. 4 is a block diagram of an exemplary battery charger, according to some embodiments.

As shown in FIGS. 3A-3B, the charging rate of a battery may be increased by using an FM signal in a frequency range determined depending on the electrolyte of the battery. For example, FIGS. 3-4 show that the second battery charged faster than the first battery using the same FM signals. Without being bound by any particular theory, the LiPF6 and LiTFSI solution of the second battery has a lower impedance caused by a higher exchange current density than the LiPF6 solution of the first battery, which facilitates increasing the charging rates of the two batteries using different FM signals to charge each battery. This lower impedance of the second battery is caused by the Li cation in the electrolyte, which is solvated by solvent molecules and anions, which the Li cation must shed to enter a solid. In some embodiments, the charge transfer rate of the second battery may be 10-100 times higher than the first battery.

FIG. 4 is a block diagram of an exemplary battery charger 410, according to some embodiments. As shown in FIG. 4, the battery charger 410 includes a signal generator 440 and a modulator 450, with the modulator 450 coupled to a DC source 460. In some embodiments, the signal generator 440 may be configured to generate and provide a modulation signal to the modulator 450, which may be configured to modulate a DC voltage and/or current signal from the DC source 460 using the modulation signal to generate an FM signal. In some embodiments, the battery charger 410 may be coupled to a power source to obtain power for generating the modulation signal, the DC signal, and/or the FM signal.

In some embodiments, the signal generator 440 may include one or more oscillators configured to generate a modulation signal during a period of time having a frequency in the MHz range during at least a first portion of the period of time. For example, the signal generator 240 may be configured to sweep the modulation signal from 0.1 MHz to 1 MHz, from 0.5 MHz to 0.6 MHz, and/or from 0.5 MHz to 3 MHz. In some embodiments, the signal generator may include a first oscillator, a second oscillator that is voltage-controlled (e.g., a VCO), and a mixer configured to generate the modulation signal by mixing signals from the first and second oscillators. In some embodiments, the signal generator may further include a high pass filter configured to generate the modulation signal as a square wave.

In some embodiments, the modulator may include at least one switch (e.g., a transistor) configured to receive the DC voltage and/or current signal from the DC source 460 at a first terminal (e.g., a first channel terminal) and the modulation signal at a second terminal (e.g., a control terminal) and provide the FM signal at a third terminal (e.g., a second channel terminal). In some embodiments, the modulator may be configured to oscillate the DC signal from a first voltage and/or current level to a second voltage and/or current level at a frequency of the modulation signal. For example, opening and closing the switch using the modulation signal may cause the voltage and/or current provided to a battery from the switch to oscillate between the first and second voltage and/or current levels, such as between a charging current level and an open circuit current level (e.g., 0 Amps).

Figure 7:
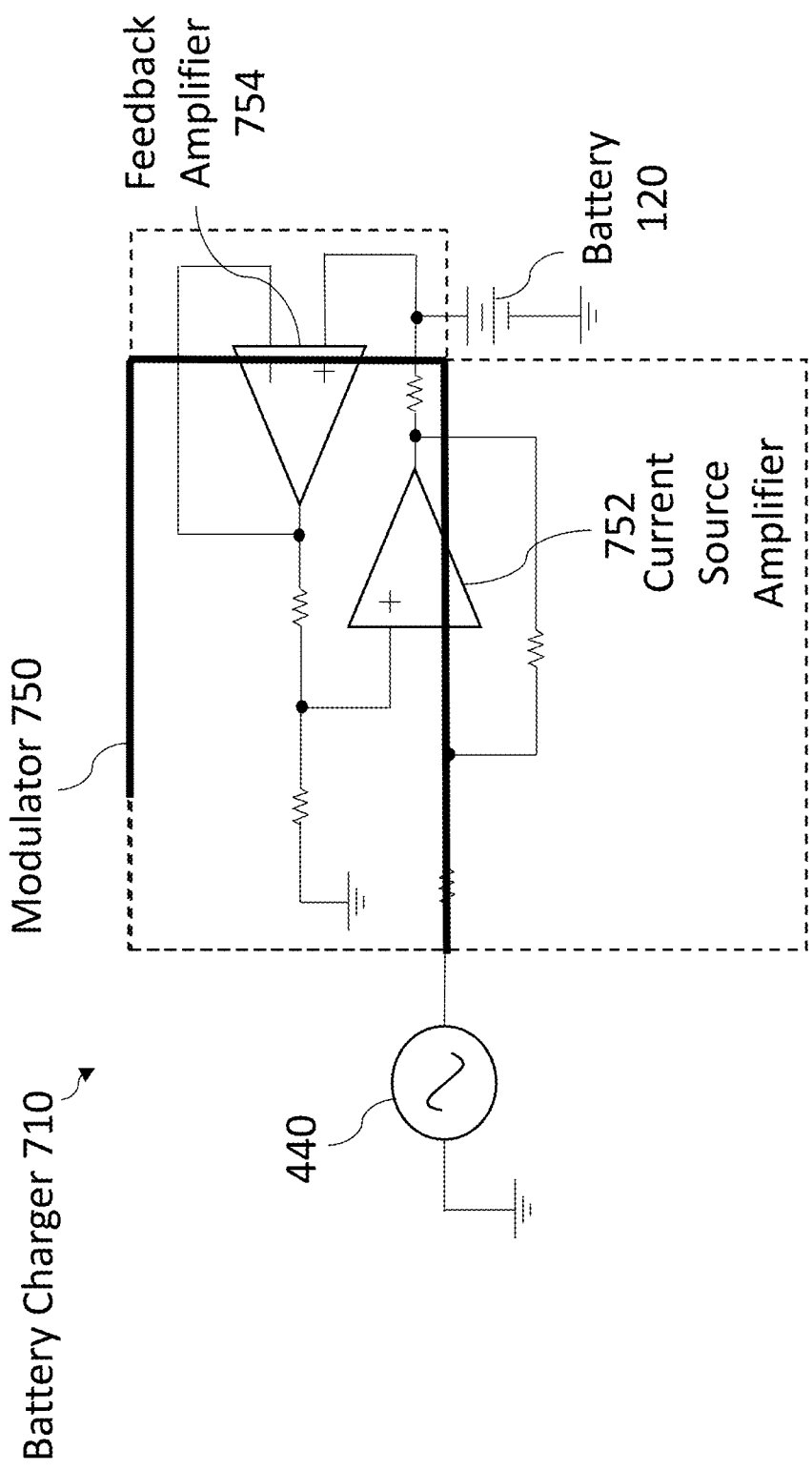
FIG. 7 is a circuit diagram of a further alternative exemplary battery charger coupled to a battery, according to some embodiments.

It should be appreciated that some embodiments do not include the DC source 460 (see, e.g., FIG. 7).

Figure 5:
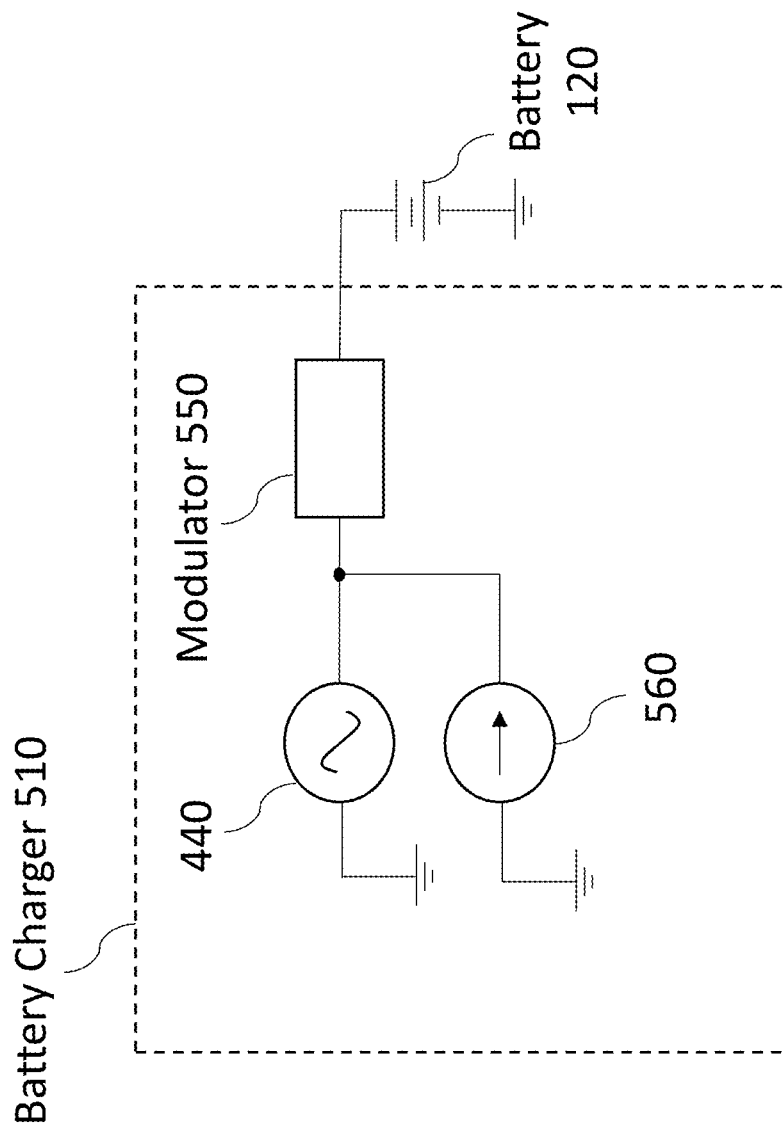
FIG. 5 is a circuit diagram of an exemplary battery charger coupled to a battery, according to some embodiments.
Figure 6:
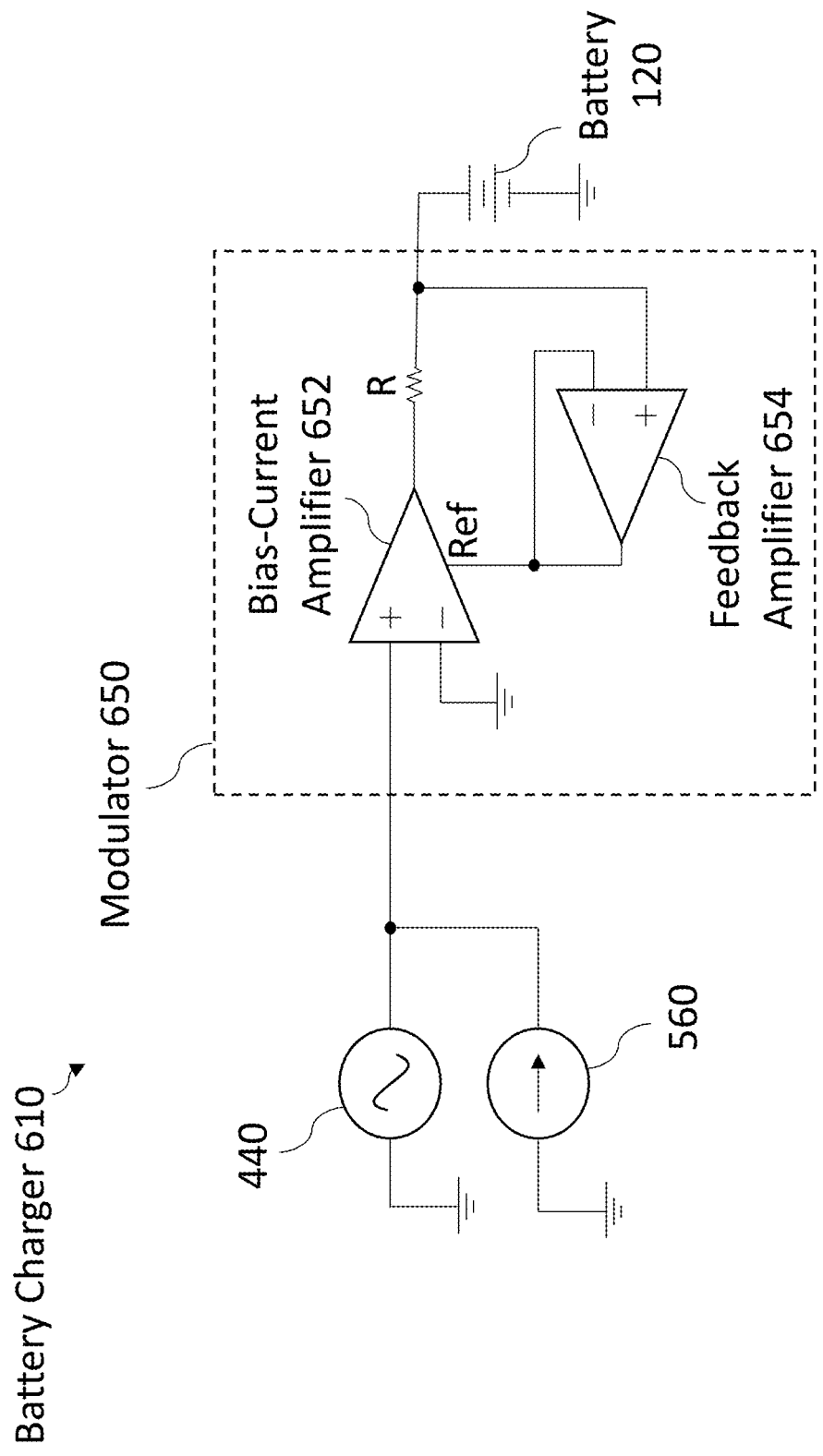
FIG. 6 is a circuit diagram of an alternative exemplary battery charger coupled to a battery, according to some embodiments.

FIG. 5 is a circuit diagram of an exemplary battery charger 510 coupled to the battery 120 of system 100, according to some embodiments. As shown in FIG. 6, the battery charger 510 includes the signal generator 440, a modulator 550, and a DC current source 560. In some embodiments, the modulator 550 may include an amplifier configured to receive a modulation signal from the signal generator 440 and a DC current signal from the DC current source 560, modulate the DC current signal using the modulation signal, and output the FM signal to the battery 120. For example, the FM signal may oscillate between an open circuit current level and a current level of the DC current signal at a frequency of the modulation signal. In some embodiments, a DC voltage source may be included in place of or in addition to the DC current source 560.

FIG. 6 is a circuit diagram of an alternative exemplary battery charger 610 coupled to the battery 120 of system 100, according to some embodiments. As shown in FIG. 6, the battery charger 610 includes the signal generator 440, the DC current source 560, and a modulator 650 including a bias-current amplifier 652 and a feedback amplifier 654. The bias-current amplifier 652 has inputs coupled to the signal generator 440, the DC current source 560, and the feedback amplifier 654, and an output coupled to the battery 120. The feedback amplifier 654 has an input coupled to the battery 120 and an output coupled to the bias-current amplifier 652. In some embodiments, the bias-current amplifier 652 may be configured to generate and provide the FM signal to the battery 120 using a feedback signal from the feedback amplifier 654, and the feedback amplifier 654 may be configured to generate the feedback signal via coupling to the battery 120. In some embodiments, the feedback signal may be a DC signal.

In some embodiments, the bias-current amplifier 652 may be configured to generate the FM signal using the modulation signal from the signal generator 440 and the DC current signal from the DC current source 560 and provide the FM signal to the battery 120. As shown in FIG. 6, the bias-current amplifier 652 has a non-inverting input coupled to the signal generator 440 and the DC current source 560 and is configured to receive the modulation signal from the signal generator 440 and the DC current signal from the DC current source 560 at the non-inverting input. The inverting input of the bias-current amplifier 652 is grounded, but may be coupled to a DC voltage source in some embodiments.

A reference terminal of the bias-current amplifier 652 is coupled to the feedback amplifier 654 and is configured to receive a feedback signal from an output of the feedback amplifier 654. For example, the bias-current amplifier 652 may be configured to generate the FM signal using the modulation signal and the DC current signal and superimpose the FM signal over the feedback signal received from the feedback amplifier 654 (e.g., oscillating the FM signal between a charging current level and an open circuit current level at the frequency of the modulation signal). Also shown in FIG. 6, an output of the bias-current amplifier 652 is coupled to the battery 120 via a resistor and is configured to provide the FM signal to the battery via the resistor.

In some embodiments, the feedback amplifier 654 may be configured to generate and provide a feedback signal to the bias-current amplifier 652. As shown in FIG. 6, the non-inverting input of the feedback amplifier 654 is coupled to the battery 120 and configured to receive a voltage of the battery 120. In some embodiments, an input of the feedback amplifier 654 may be coupled to the battery 120 via a resistive divider (e.g., providing only a portion of the battery voltage to the feedback amplifier 654). The inverting input of the feedback amplifier 654 is coupled to the output of the feedback amplifier 654, such that feedback amplifier 654 is in a buffer configuration configured to provide the battery voltage to the reference terminal of the bias-current amplifier 652.

FIG. 7 is a circuit diagram of a further alternative exemplary battery charger 710 coupled to the battery 120 of FIG. 1, according to some embodiments. As shown in FIG. 7, the battery charger 710 includes the signal generator 440 and a modulator 750 that includes a current source amplifier 752 and a feedback amplifier 754, with inputs of the current source amplifier 752 coupled to the signal generator 440 and the feedback amplifier 754, an output of the current source amplifier 752 coupled to the battery 120, and the feedback amplifier 754 coupled between the battery 120 and the current source amplifier 752. In some embodiments, the current source amplifier 752 may be configured to receive a modulation signal from the signal generator 440 and a feedback signal indicative of the battery voltage from the feedback amplifier 754, generate the FM signal using the modulation signal 440 and the feedback signal, and provide the FM signal to the battery 120. In some embodiments, the feedback amplifier 754 may be configured to receive the battery voltage from the battery 120 and provide a feedback signal to the current source amplifier 752 that is indicative of the battery voltage. In some embodiments, the feedback signal may be a DC signal.

In some embodiments, the current source amplifier 752 may be configured to generate the FM signal using the modulation signal from the signal generator 440 and the feedback signal from the feedback amplifier 754. As shown in FIG. 7, the inverting input of the current source amplifier 752 is coupled to the signal generator 440 and configured to receive the modulation signal, and the non-inverting input is coupled to the feedback amplifier 754 and configured to receive the feedback signal. In some embodiments, the current source amplifier 752 may be configured to modulate the feedback signal using the modulation signal to generate the FM signal at the output of the current source amplifier 752. For example, the current source amplifier 752 may be configured to output the FM signal having first and second current levels set by the feedback signal at a frequency set by the modulation signal (e.g., oscillating the FM signal between a charging current level and open circuit current at the frequency of the modulation signal). As shown in FIG. 7, the output of the current source amplifier is coupled to the battery 120 via a resistor and is configured to provide the FM signal to the battery 120 via the resistor.

In some embodiments, the feedback amplifier 754 may be configured to generate the feedback signal using the battery voltage. As shown in FIG. 7, the non-inverting input of the feedback amplifier 754 is coupled to the battery 120 and the inverting input of the feedback amplifier 754 is coupled to the output, such that the feedback amplifier 754 is in a buffer configuration configured to provide the battery voltage at the output. In some embodiments, the inverting input of the feedback amplifier 754 may be coupled to the battery 120 via resistive divider, as described for feedback amplifier 654 in connection with FIG. 6.

Figure 8:
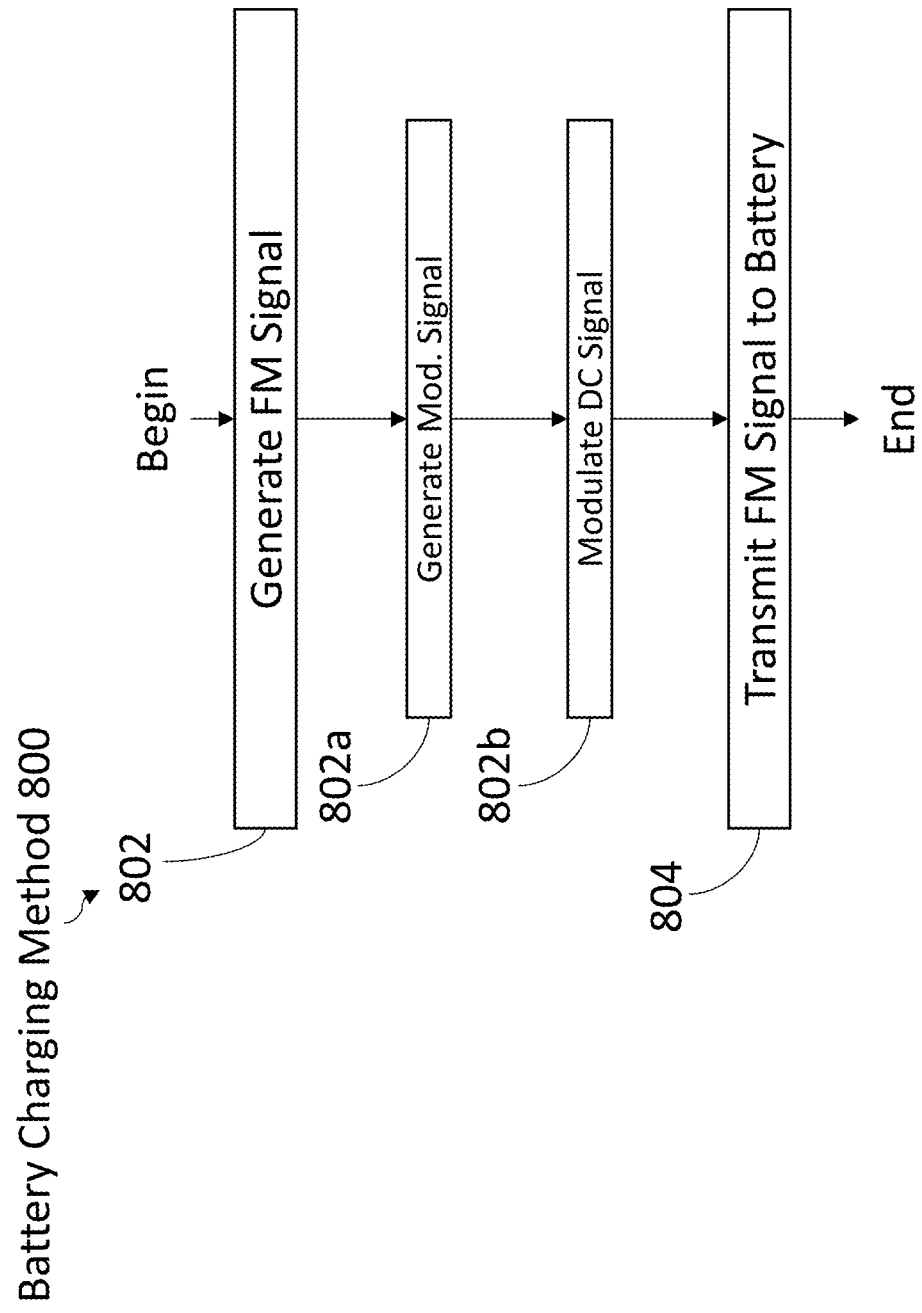
FIG. 8 is a flow diagram of an exemplary method of charging a battery, according to some embodiments.

FIG. 8 is a flow diagram of an exemplary method 800 of charging a battery, according to some embodiments. In FIG. 8, method 800 includes generating an FM signal at step 802 and transmitting the FM signal to a battery at step 804. In some embodiments, the method 800 may be performed by of the exemplary battery chargers described herein, such as the battery charger 110 of FIG. 1A. For example, the method 800 may be used to charge the battery 120 of the apparatus 102.

In some embodiments, generating the FM signal at step 802 may include generating a modulation signal at step 802a having a frequency of at least 0.5 MHz during at least a portion of a period of time. In some embodiments, the modulation signal may have a frequency of at least 1 MHz, at least 2 MHz, or at least 3 MHz. For example, the modulation signal may be modulated over a frequency range from 0.1 MHz to 1 MHz, from 0.5 MHz to 0.6 MHz, and/or from 0.5 MHz to 3 MHz by a signal generator described herein, such as the signal generator 440 described herein including in connection with FIG. 4. In some embodiments, generating the modulated signal may include sweeping the modulation signal over the frequency range. For example, the modulated signal may be swept from 0.1 MHz to 1 MHz, from 0.5 MHz to 0.6 MHz, and/or from 0.5 MHz to 3 MHz.

In some embodiments, generating the FM signal at step 802 may include modulating a DC signal using the modulation signal at step 802b. For example, a modulator such as the modulator 550, 650, or 750, described herein including in connection with FIGS. 5-7, may receive the DC signal and the modulation signal and generate the FM signal using the DC signal and the modulation signal. In some embodiments, the DC signal may be generated using a DC current source, such as the DC current source 560 described herein including in connection with FIG. 5. Alternatively, the DC signal may be a feedback signal generated using a voltage of the battery. In some embodiments, the modulator may receive feedback from the battery, such as by receiving the voltage of the battery via coupling to the battery and/or via a resistive divider coupled to the battery, and the feedback signal may be generated using the voltage of the battery. For example, the feedback signal may be generated by a feedback amplifier (e.g., feedback amplifier 654 or 754 described herein including in connection with FIGS. 6-7) and provided to a bias-current amplifier (e.g., 652 described herein including in connection with FIG. 6) or a current source amplifier (e.g., 752 described herein including in connection with FIG. 7). In some embodiments, generating the FM signal using the DC signal and the modulation signal may include oscillating the DC signal between a first level and a second level (e.g., between a charging current level and an open circuit current level and/or between a charging voltage level and ground) at a frequency of the modulation signal.

In some embodiments, transmitting the FM signal to the battery at step 804 may include transmitting the FM signal over at least one electrical cable. For example, the FM signal may be transmitted to a battery that is included in an apparatus, such as an electric car. In some embodiments, the method 800 may further include removably coupling and/or decoupling the electrical cable(s) from the battery, such as by connecting and/or disconnecting the electrical cable(s) from the battery and/or from the battery charger. In some embodiments, method 800 may further include powering at least one electric component of the apparatus, such as an electric motor of an electric car, using the battery. For example, the electric component may be configured to draw power from the battery using an FM signal as described herein for transmitting to the battery to charge the battery.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The acts performed as part of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately," "substantially," and "about" may include the target value.

What is claimed is:

1. A battery charging system, comprising:
a battery; and
a battery charger, configured to:
generate a frequency modulated (FM) signal that, during a period of time:
oscillates between a first current and/or voltage level and a second current and/or voltage level; and
has a frequency of at least 0.5 megahertz (MHz) during at least a first portion of the period of time; and
apply the FM signal to at least one terminal of the battery during the period of time such that, when the FM signal has the second current and/or voltage level, a current and/or voltage at the at least one terminal of the battery is substantially zero.

2. The system of claim 1, wherein the battery charger comprises signal generation circuitry configured to generate the FM signal having the frequency of at least 0.5 MHz during at least the first portion of the period of time.

3. The system of claim 2, wherein the signal generation circuitry is configured to generate the FM signal having a frequency of at least 1 MHz during at least the first portion of the period of time.

4. The system of claim 2, wherein the signal generation circuitry is configured to sweep the FM signal from a first frequency to a second frequency repeatedly during the period of time, the first frequency being at least 0.1 MHz.

5. The system of claim 2, wherein the signal generation circuitry is configured to sweep the FM signal from a first frequency to a second frequency repeatedly during the period of time, wherein the first frequency is at least 0.5 MHz.

6. The system of claim 2, wherein:
the signal generation circuitry is configured to generate a modulation signal having the frequency of at least 0.5 MHz during at least the first portion of the period of time; and
the battery charger further comprises modulation circuitry configured to modulate a direct-current (DC) current signal with the modulation signal to generate the FM signal at least in part by oscillating the modulation signal between open circuit current and a charging current during the period of time.

7. The system of claim 6, wherein the battery comprises a lithium-hexafluorophosphate (LiPF6) salt.

8. The system of claim 7, wherein the battery further comprises a lithium-bistrifluoromethanesulfonylimide (LiTFSI) salt.

9. The system of claim 1, wherein the battery comprises an electrolyte selected from a group consisting of:
lithium-hexafluorophosphate ($LiPF_6$) in dimethyl carbonate (DMC);
lithium-bistrifluoromethanesulfonylimide (LiTFSI) in DMC;
$LiPF_6$ solution and LiTFSI in DMC; and
$LiPF_6$ in DMC and ethyl carbonate (EC).

10. A battery charger configured to:
generate a frequency modulated (FM) signal that, during a period of time:
oscillates between a first current and/or voltage level and a second current and/or voltage level; and
has a frequency of at least 0.5 megahertz (MHz) during at least a first portion of the period of time; and
apply the FM signal to at least one terminal of a battery during the period of time such that, when the FM signal has the second current and/or voltage level, a current and/or voltage at the at least one terminal of the battery is substantially zero.

11. The battery charger of claim 10, further comprising signal generation circuitry configured to generate the FM signal having a frequency of at least 1 MHz during at least the first portion of the period of time.

12. The battery charger of claim 11, wherein the signal generation circuitry is configured to generate the FM signal having a frequency of at least 3 MHz during at least the first portion of the period of time.

13. The battery charger of claim 11, wherein the signal generation circuitry is configured to sweep the FM signal from a first frequency to a second frequency repeatedly during the period of time, the first frequency being at least 0.1 MHz.

14. The battery charger of claim 11, wherein the signal generation circuitry is configured to sweep the FM signal from a first frequency to a second frequency repeatedly during the period of time, wherein the first frequency is at least 0.5 MHz.

15. The battery charger of claim 11, wherein:
the signal generation circuitry is configured to generate a modulation signal having the frequency of at least 0.5 MHz during at least the first portion of the period of time; and the battery charger further comprises modulation circuitry configured to modulate a direct-current (DC) current signal with the modulation signal to generate the FM signal at least in part by oscillating the modulation signal between open circuit current and a charging current during the period of time.

16. A method comprising:
applying, to at least one terminal of a battery, a frequency modulated (FM) signal modulated over a frequency range during a period of time and oscillating between a first current and/or voltage level and a second current and/or voltage level such that, when the FM signal has the second current and/or voltage level, a current and/or voltage at the at least one terminal of the battery is substantially zero,
wherein the FM signal has a frequency of at least 0.5 megahertz (MHz) during at least a first portion of the period of time.

17. The method of claim 16, wherein the FM signal has a frequency of at least 1 MHz during at least the first portion of the period of time.

18. The method of claim 16, wherein the FM signal has a frequency of at least 3 MHz during at least the first portion of the period of time.

19. The method of claim 16, wherein the FM signal is swept from a first frequency to a second frequency repeatedly during the period of time, and the first frequency is at least 0.1 MHz.

20. The method of claim 16, further comprising modulating a direct-current (DC) current signal with a modulation signal to generate the FM signal at least in part by oscillating a current of the modulation signal between an open circuit current and a charging current, wherein the modulation signal has the frequency of at least 0.5 MHz during at least the first portion of the period of time.

* * * * *